Dec. 15, 1964   R. F. CREASEY ETAL   3,161,378
SUPERSONIC AIRCRAFT WING WITH POWERPLANT
Filed July 26, 1963
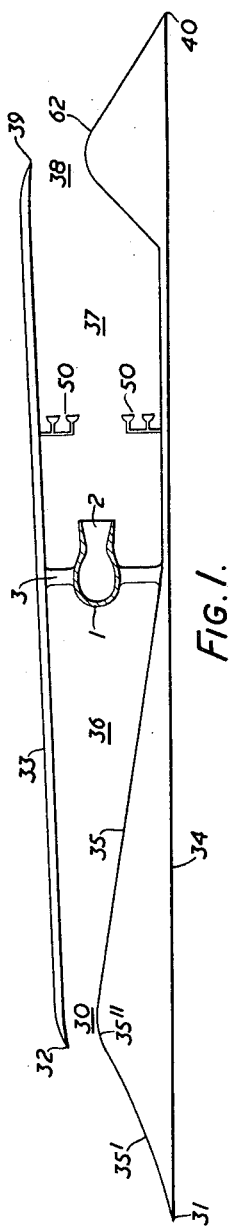
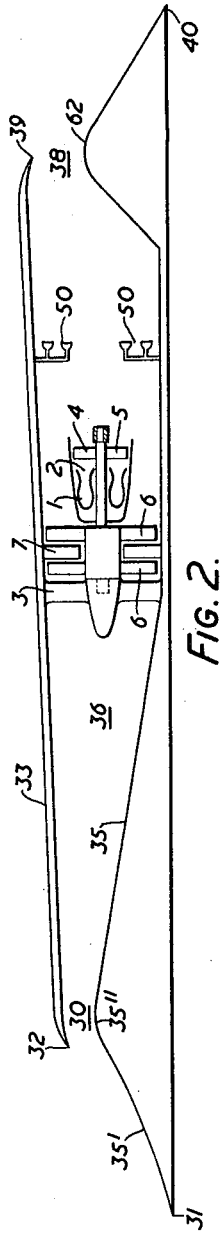
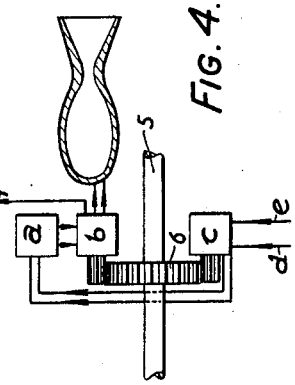
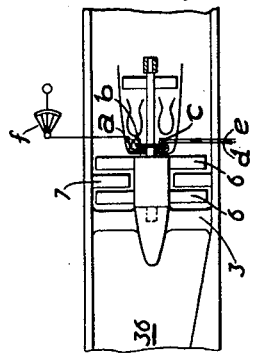
INVENTORS
Raymond Frederick Creasey
BY Peter John Cooper
Martin E. Hogan, Jr.
ATTORNEY

United States Patent Office 3,161,378
Patented Dec. 15, 1964

3,161,378
SUPERSONIC AIRCRAFT WING WITH POWERPLANT
Raymond Frederick Creasey and Peter John Cooper, Lytham, St. Annes, England, assignors to English Electric Aviation Limited, Westminster, London, England, a British company
Filed July 26, 1963, Ser. No. 297,922
Claims priority, application Great Britain, July 31, 1962, 29,494/62
4 Claims. (Cl. 244—53)

The present invention relates to supersonic aircraft of the type described in the patent specification No. 2,956,759 filed on January 29, 1958 (Ser. No. 712,041) by R. F. Creasey, B. O. Heath and S. Walmsley, assignors to The English Electric Company Limited according to which an aircraft wing incorporates in its interior a power installation for the propulsion of the aircraft, wherein said wing and power installation form with one another a structurally, aerodynamically and thermodynamically integrated structure guiding the flow of air over an upper and a lower wing panel of the said wing and the flow of ram air and of combustion products through ducts in the said wing, the leading edge of one of said wing panels protruding forward of the leading edge of the other wing panel. This protruding leading edge is followed consecutively by a two dimensional isentropic curve portion and inner panel, said isentropic curve portion generating shock waves which on the design speed converge on the leading edge of said other wing panel forming the lip of a ram air intake having its throat between said other wing panel and the said inner panel. The said isentropic curve causes efficient continuous compression of the air entering the intake, and permits the said lip on the opposite outer wing panel to function efficiently by virtue of the fact that at design conditions the pressure changes are focused thereon, whereby spillage of air is obviated. Immediately behind said throat the inner panel turns away from its opposite outer wing panel and encloses with the latter a divergent diffuser leading to the entry of the said ducts where the jet propulsion power installation is located.

At the exit from the said ducts a convergent-divergent nozzle, preferably of variable throat, is provided, through which the propulsive gases of the jet propulsion power installation are discharged at the trailing edge of the wing.

In a first modification in the aircraft wing a forward main structural wing portion consists of an upper and a lower lift producing panel defining at their leading edges an air intake producing compressive shock waves at supersonic speeds and a divergent diffuser joining said air intake aft of it in the chordwise direction arranged between the said lift producing panels, the said panels, air intake and diffuser being integrated structurally, aerodynamically and thermodynamically into a rigid unit guiding the air over and through the said forward wing portion and carrying all the aerodynamic and thermodynamic loads and thermal stresses arising therefrom, and a rear wing portion consists of an upper and lower lift producing panel and chordwise disposed splitter plates dividing the said rear wing portion into separate compartments alternately housing ram-jet and turbo-jet engines, and structurally combining the said lift producing panels of the said rear wing portion into a self-contained unit carrying all the aerodynamic and thermodynamic loads and thermal stresses arising, the said rear wing portion being connected cantilever fashion to the said forward wing portion and transmitting its overhang loads thereto through vertical plates extending chordwise into both wing portions and dividing the said rear wing portion into the said separate compartments, joints permitting differential thermal expansion of the said forward and rear wing portions in the spanwise direction being provided at the upper and lower wing panels of the said wing portions.

The present invention has the primary object of providing an improved supersonic aircraft wing of the kind described, in particular one having superior powers of acceleration and boost.

With this and other objects in view which will become apparent from this specification and the accompanying drawings, we provide a supersonic aircraft wing comprising in combination: an upper wing panel having a leading edge and a trailing edge, a lower wing panel having a leading edge protruding forward beyond the leading edge of said upper wing panel and a trailing edge protruding rearward beyond the trailing edge of said upper wing panel, an inner wing panel having a leading edge integral with the leading edge of said lower wing panel, a two-dimensional isentropic surface aft of said leading edge and at supersonic speed generating shock waves converging on the leading edge of said upper wing panel, a hump aft of said isentropic surface including a throat with said upper wing panel immediately aft of the leading edge thereof, a diverging two-dimensional diffuser aft of said throat, a combustion chamber aft of said diffuser, a hump between said combustion chamber and the trailing edge of said lower wing panel and including a two-dimensional convergent divergent nozzle with the trailing edge of said upper wing panel, struts integrating said upper, inner and lower wing panels to a structural unit, and rocket motors mounted on said struts, inducing in operation an additional mass flow of air through said wing.

These rocket motors may be of the known type comprising a combustion chamber and downstream thereof a convergent-divergent nozzle fixedly mounted in the wing duct, or a new type of rocket engine, wherein a cluster of rocket combustion chambers each with a convergent-divergent nozzle is grouped round the shaft of a turbine wheel driven by the rocket exhaust gases and driving a compressor or fan, which induces an additional draught on the air flow in the wing duct, in the manner of a ducted fan or by-pass turbo jet engine.

Downstream of these rocket motors, which may be supplied with solid or liquid fuel ram jet burners may be installed if desired.

The rocket propulsion engines of either type or of both types combined e.g. alternating along the wing span, are used for producing the propulsive force for take-off and acceleration from subsonic to supersonic speed, when the ram jet engines may take over the propulsion, and the rocket propulsion engines kept in reserve for boosting, if desired.

The turbo-jet engines according to previous proposals may be completely or partly replaced by the rocket propulsion engines according to the present invention.

These and other features of our said invention will be clearly understood from the following description of some embodiments thereof given by way of example with reference to the accompanying drawings, in which:

FIG. 1 is a diagrammatic chordwise section through a wing compartment containing a conventional rocket propulsion engine and a ram jet engine, and FIG. 2 is a diagrammatic chordwise section through a wing compartment containing a rocket-driven turbine driving a compressor, and a ram jet engine.

FIG. 3 is a part section corresponding to FIG. 2 of a modified embodiment, and

FIG. 4 is a detail of FIG. 3 on a larger scale.

The aircraft wing has an upper wing panel 33 having a leading edge 32 and trailing edge 39, and a lower wing panel 34 having a leading edge 31 protruding beyond the leading edge 32 and a trailing edge 40 protruding beyond the trailing edge 39. An inner wing panel 35 begins at the leading edge 31 with an isentropic curve section 35′ followed by a hump 35″ including a throat 30 with the leading edge portion of the upper wing panel 33, followed by a diffuser section 36. Then follows a combustion chamber 37 and a convergent-divergent nozzle 38 included between the trailing edge 39 of the upper wing panel 33 and a hump 62 on the lower wing panel 34 before the trailing edge 40 thereof.

The upper and lower wing panels 33, 34 and the inner wing panel 35 are structurally integrated with one another, only one strut 3 being shown.

Shock waves originating from the isentropic curve section 35′ compress the air entering through the throat 30, and a further pressure rise is attained in the divergent diffuser section 36.

A conventional rocket engine having a combustion chamber 1 and a convergent-divergent nozzle 2 (FIG. 1) is mounted on the strut 3 between the two panels 33 and 34, and ram jet burners 50 may be mounted downstream of the rocket 1, 2, if desired.

Alternatively of or alternating with installations according to FIG. 1 a new propulsive engine may be installed as shown in FIG. 2: a cluster of rocket combustion chambers 1 with convergent-divergent nozzles 2 is grouped around the shaft 5 of a turbine wheel 4 driving a compressor or fan having two rotor bladings 6, with a stator blading 7 arranged between them. The strut 3 may be constructed as an inlet stator blading for the first rotor stage. Ram jet burners 50 may likewise be installed downstream of the new rocket propulsion engine 1–7.

Referring now to FIGURES 3 and 4 means are provided to supply fuel and oxidant separately to the fuel control system of the new rocket propulsion engine. The means of supply may be pressurized tanks external to the engine, or a pump driven mechanically from the engine turbine, or a pump driven by some other source of power in the aircraft, or a combination of any or all of these means.

The engine fuel control system operates by means of servo-controls which respond to signals indicative of air pressures, air and engine temperatures, and engine rotational speed and which, according to known relationships, adjust the supply of propellants to maintain the engine operating conditions appropriate to the aircraft, height, speed, and flight attitude selected by the pilot. In one form of control system, for example, fuel and oxidant are delivered through pipes $e$ and $d$, respectively to a flow control unit $a$. The flow control unit adjusts the fuel and oxidant flows automatically with changes in airflow, maintains the turbine gas temperatures at a safe working level and ensures smooth acceleration of the engine irrespective of the speed of opening of the throttle valve. Control of the engine is effected by means of an all-speed governor $b$, engine speed being determined by the position of the pilot's lever $f$ irrespective of aircraft speed and altitude.

The main types of rockets which can be distinguished are—

(1) By mode of operation:
    (*i*) Pressure fed.
    (*ii*) Pump fed.
    (*iii*) Fixed thrust.
    (*iv*) Variable thrust.
(2) By propellant type:
    (*i*) Liquid fuel—liquid oxidant, hypergolic.
    (*ii*) Liquid fuel—liquid oxidant, requiring ignition system.
    (*iii*) Hybrid:
        (*a*) Liquid fuel—solid oxidant.
        (*b*) Solid fuel—liquid oxidant.
    (*i*) and (*ii*) may be further separated as "cryogenic" or "storable."

The rocket combustion chambers of both types of engines may be supplied with solid or liquid fuel. The rocket propulsion engine according to FIG. 1 and/or the rocket driven turbo-compressor according to FIG. 2 are to be used instead of (or in addition to some of) the turbo-jet engines according to previous proposals and provide a propulsive force for the take off and acceleration from subsonic to supersonic speed, while the ram jet engines may be used for cruising at supersonic speed, when the two types of rocket engines according to FIGS. 1 and/or 2 are available for boosting, if desired.

Both types of rocket engines are arranged to induce an additional flow of air through the wing, adding to the mass flow available for propulsion, and cooling the wing against excessive heating. The turbo-jet engines according to previous proposals may be omitted altogether if desired.

While we have described herein and illustrated in the accompanying drawings what may be considered typical and particularly useful embodiments of our said invention, we wish it to be understood that we do not limit ourselves to the particular details and dimensions described and illustrated; for obvious modifications will occur to a person skilled in the art.

We claim:

1. A supersonic aircraft wing comprising in combination: an upper wing panel having a leading edge and a trailing edge, a lower wing panel having a leading edge protruding forward beyond the leading edge of said upper wing panel and a trailing edge protruding rearward beyond the trailing edge of said upper wing panel, an inner wing panel having a leading edge integral with the leading edge of said lower wing panel, a two-dimensional isentropic surface aft of said leading edge and at supersonic speed generating shock waves converging on the leading edge of said upper wing panel and inducing a main airflow between said upper and inner wing panels, a hump aft of said isentropic surface including a throat with said upper wing panel immediately aft of the leading edge thereof, a diverging two-dimensional diffuser aft of said throat, a combustion chamber aft of said diffuser, a hump between said combustion chamber and the trailing edge of said lower wing panel and including a two-dimensional convergent-divergent nozzle with the trailing edge of said upper wing panel, struts integrating said upper, inner and lower wing panels to a structural unit and rocket motors mounted on said struts, inducing in operation a mass flow through said wing additional to said main air flow.

2. A supersonic aircraft wing as claimed in claim 1, wherein each of said rocket motors comprises a combustion chamber and a convergent-divergent nozzle immediately downstream of said combustion chamber.

3. A supersonic aircraft wing as claimed in claim 1, wherein each of said rocket motors comprises a shaft journalled rotatably about a chordwise axis on one of said struts, a cluster of combustion chambers with a convergent-divergent nozzle arranged downstream of each said combustion chamber grouped around said shaft and fixedly connected with said wing structure, a turbine wheel mounted on said shaft downstream of said convergent-divergent nozzle and in operation impinged upon by the exhaust gases emerging therefrom, compressor rotor blading mounted on said shaft and compressor stator blading in operative relationship with said rotor blading, said compressor blading in operation inducing said additional mass flow through the wing.

4. A supersonic aircraft wing as claimed in claim 1 comprising ram jet engines spanwise alternating with said rocket motors in the interior of said wing and propelling said aircraft wing at supersonic cruising speeds, said rocket motor serving for take-off, acceleration to supersonic speed and boosting.

References Cited by the Examiner

UNITED STATES PATENTS

| | | | |
|---|---|---|---|
| 2,404,954 | 7/46 | Godsey | 244—73 X |
| 2,547,936 | 3/51 | Grow | 60—35.6 |
| 2,735,263 | 2/56 | Charshafian | 60—35.6 |
| 2,956,759 | 10/60 | Creasey | 244—53 X |
| 3,111,005 | 11/63 | Howell et al. | 60—35.6 |

FOREIGN PATENTS 228,437  12/57  Australia.

FERGUS S. MIDDLETON, *Primary Examiner.*

ANDREW H. FARRELL, *Examiner.*